United States Patent
Yamanaka et al.

[11] Patent Number: 5,788,276
[45] Date of Patent: Aug. 4, 1998

[54] UTILITY VEHICLE

[75] Inventors: Shinji Yamanaka; Masahiro Yamamoto; Toshiharu Nasuno; Tadashi Yamashita, all of Wako, Japan

[73] Assignee: Honda Giken Kogyo Kabushiki Kaisha, Tokyo, Japan

[21] Appl. No.: 914,092

[22] Filed: Aug. 19, 1997

Related U.S. Application Data

[62] Division of Ser. No. 576,197, Dec. 22, 1995, Pat. No. 5,704,643.

[30] Foreign Application Priority Data

Dec. 26, 1994 [JP] Japan ................................. 6-323074
Dec. 28, 1994 [JP] Japan ................................. 6-328659

[51] Int. Cl.$^6$ ........................................................ B62D 1/00
[52] U.S. Cl. ........................ 280/771; 74/498; 180/431; 180/409
[58] Field of Search .............................. 280/771, 263; 74/498; 180/431, 400, 409

[56] References Cited

U.S. PATENT DOCUMENTS

| | | | |
|---|---|---|---|
| 4,441,735 | 4/1984 | Hutchison | 280/771 |
| 4,613,009 | 9/1986 | Nakamura et al. | 180/253 |
| 4,766,983 | 8/1988 | Tamba et al. | |
| 4,862,981 | 9/1989 | Fujikawa et al. | |
| 4,917,201 | 4/1990 | Fujikawa et al. | |
| 4,977,733 | 12/1990 | Samejima et al. | 280/99 X |
| 5,042,604 | 8/1991 | Tone et al. | |
| 5,228,530 | 7/1993 | Tsuchihashi | |
| 5,531,466 | 7/1996 | Hayashi | 280/91.1 |

FOREIGN PATENT DOCUMENTS

| | | |
|---|---|---|
| 2-99713 | 4/1990 | Japan |
| 5-36789 | 9/1993 | Japan |

*Primary Examiner*—Christopher P. Ellis
*Attorney, Agent, or Firm*—Nikaido, Marmelstein, Murray & Oram LLP

[57] ABSTRACT

In a utility vehicle, a muffler accommodating chamber is defined in front of and below an engine mounted at a front portion of a vehicle frame. A rear wall of the muffler accommodating chamber is formed by a front axle frame which is mounted to extend between both of vertical frame portions of the vehicle frame and supports a front axle beam for rotatably supporting front wheels at its opposite ends. The front axle frame has a function to support the front axle beam, a function as a strength member in the form of a cross member, and a function as a member defining the muffler accommodating chamber. A driving gear is mounted to a steering shaft and thrust-supported by a lower surface of a support portion of a support frame which is fixedly mounted on the vehicle frame. A driven gear meshed with the driving gear and a pitman arm are connected to a rotary shaft whose axially upward movement is limited by the support portion and whose axially downward movement is limited by a bracket mounted to the vehicle frame. Thus, the assembling and disassembling of a steering system are facilitated, and it is possible to protect the driving and driven gears from an external force and to accurately determine a distance between the steering shaft and the rotary shaft.

6 Claims, 11 Drawing Sheets

UTILITY VEHICLE

This is a division of application Ser. No. 08/576,197, filed Dec. 22, 1995, now U.S. Pat. No. 5,704,643.

BACKGROUND OF THE INVENTION

1. Field of the Invention

The present invention relates to a utility vehicle such as a riding lawn mower and the like.

2. Description of Related Prior Art

For example, in Japanese Patent Application Laid-open No.99713/90, a utility vehicle is disclosed which includes a vehicle frame which is comprised of a pair of vertical frame portions extending in a longitudinal direction in parallel to each other and interconnected at their upper ends by a connecting plate portion, an engine mounted at a front portion of the vehicle frame, a muffler accommodating chamber which is formed in front of and below the engine and to which air after cooling the engine is introduced, a muffler connected to the engine and accommodated in the muffler accommodating chamber, and a front axle frame mounted to the vehicle frame and having a substantially U-shape in cross section with a bottom thereof opened. In such utility vehicle, however, a member other than the front axle frame is mounted to the vehicle frame to define a muffler accommodating chamber and hence, the structure is not simple.

Therefore, it is a first object of the present invention to provide a utility vehicle, wherein the structure is simplified while permitting the front axle frame to have more functions.

In addition, for example, in Japanese Utility Model Publication No.36789/93, a utility vehicle is disclosed which includes a steering shaft which is provided at its upper end with a steering wheel, a driving gear mounted on the steering shaft in operative association with the steering shaft, a rotary shaft which has an axis substantially parallel to the steering shaft and to which a pitman arm is connected, and a driven gear which is fixed to the rotary shaft and meshed with the driving gear. In such utility vehicle, it is necessary to protect components such as the steering shaft, the rotary shaft, the driving gear and the driven gear from an external force to enhance a reliability. On the other hand, it has been required to simplify the assembling and disassembling operation, so as to facilitate a maintenance work and to reduce the number of parts. However, the Japanese Utility Model Publication No.36789/93 does not disclose any structure which can satisfy the above-mentioned requirement.

Therefore, it is a second object of the present invention to provide a utility vehicle, wherein the reliability of the structure between the steering shaft and the pitman arm is enhanced and moreover, the assembling and disassembling operations are facilitated, thereby facilitating the maintenance work and reducing the number of parts.

SUMMARY OF THE INVENTION

To achieve the first object, according to the present invention, there is provided a utility vehicle, comprising: a vehicle frame which is comprised of a pair of vertical frame portions extending in a longitudinal direction in parallel to each other and interconnected at their upper ends by a connecting plate portion; an engine mounted at a front portion of the vehicle frame, a muffler accommodating chamber which is formed in front of and below the engine and to which air after cooling the engine is introduced; a muffler connected to the engine and accommodated in the muffler accommodating chamber; and a front axle frame mounted to the vehicle frame and having a substantially U-shape in cross section with a bottom thereof opened, wherein the front axle frame is provided in back of the muffler to extend between both the vertical frame portions of the vehicle frame for swingably supporting a lengthwise central portion of a front axle beam which rotatably supports front wheels at its opposite ends, the front axle frame being mounted to the vehicle frame to form a rear wall of the muffler accommodating chamber.

With such arrangement, the front axle frame performs a function to support the front axle beam, a function as a strength member serving a cross member for interconnecting both the vertical frame portions of the vehicle frame, and a function as a member for defining the muffler accommodating chamber.

According to another aspect and feature of the present invention, a driving pulley is mounted on a crankshaft of the engine mounted on the vehicle frame and which is located in a vicinity of and in back of the lengthwise central portion of the front axle beam, and an endless belt is wound around the driving pulley for transmitting a power to a utility tool disposed below the vehicle frame, the front axle beam being formed such that a height thereof increases toward the center of a swinging movement thereof, so as to avoid to assume a position in front of the driving pulley.

Thus, even if the endless belt is sprung forwardly from the driving pulley, the endless belt cannot come into contact with the front axle beam.

According to a further aspect of the present invention, a pair of bumpers is mounted to the vehicle frame at a vertical distance in locations to cover a front cover from the front, and is formed into a rod-like configuration to extend in a widthwise direction of the vehicle frame.

Thus, the existing of the pair of bumpers in front of the front cover avoids the collision of a foreign matter against the front cover from the front. In addition, since the bumpers are disposed at the vertical distance, it is possible for cooling air to flow between the bumpers toward the front cover, and the outward appearance of the bumpers is satisfactory.

To achieve the second object, according to the present invention, there is provided a utility vehicle, comprising: a steering shaft provided at an upper end thereof with a steering wheel; a driving gear mounted on the steering shaft in operative association with the steering shaft; a rotary shaft which has an axis substantially parallel to the steering shaft and to which a pitman arm is continuously formed, and a driven gear which is fixed to the rotary shaft and meshed with the driving gear, wherein the utility vehicle further includes a support frame fixedly mounted on the vehicle frame and having a support portion, the driving gear thrust-supported on a lower surface of the support portion being mounted to and in operative association with the steering shaft which is inserted into and supported in the support portion, the rotary shaft passed through a through-hole provided in the vehicle frame being rotatably supported by the support portion and by a bracket mounted to the vehicle frame, in such a manner that in a condition that an axially upward movement of the rotary shaft is limited by the support portion and the axially downward movement of the rotary shaft is limited by the bracket, and the pitman arm and the driven gear meshed with the driving gear below the support portion being connected to the rotary shaft.

With such arrangement, the steering shaft is rotatably supported by the support portion in such a manner that at least the upward movement thereof is limited by the fact that the driving gear is thrust-supported by the support portion. The rotary shaft is rotatably supported by the support portion and the bracket in such a manner that the axially upward and downward movements thereof are limited. Since the driving and driven gears are disposed between the support portion and the bracket, it is possible to protect the driving and driven gears from an external force. Further, by the fact that a lower end of the steering shaft and an upper end of the rotary shaft are supported by the support portion, it is possible to accurately determine the distance between the steering shaft and the rotary shaft.

The above and other objects, features and advantages of the invention will become apparent from the following description of a preferred embodiment taken in conjunction with the accompanying drawings.

DESCRIPTION OF THE PREFERRED EMBODIMENTS

The present invention will now be described by way of a preferred embodiment with reference to the accompanying drawings.

Figure 1:
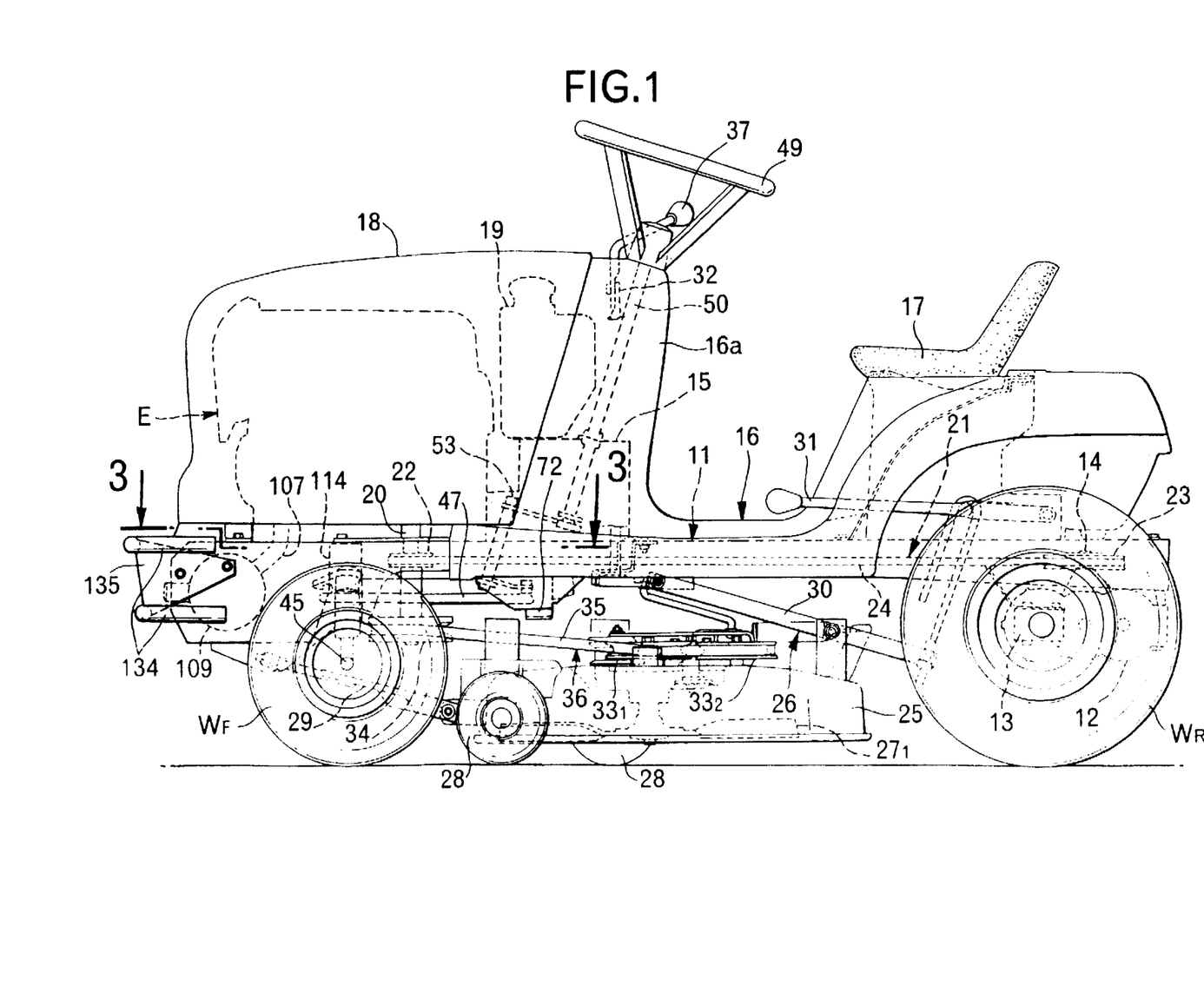
FIG. 1 is a side view of a riding lawn mower according to an embodiment of the present invention.
Figure 2:
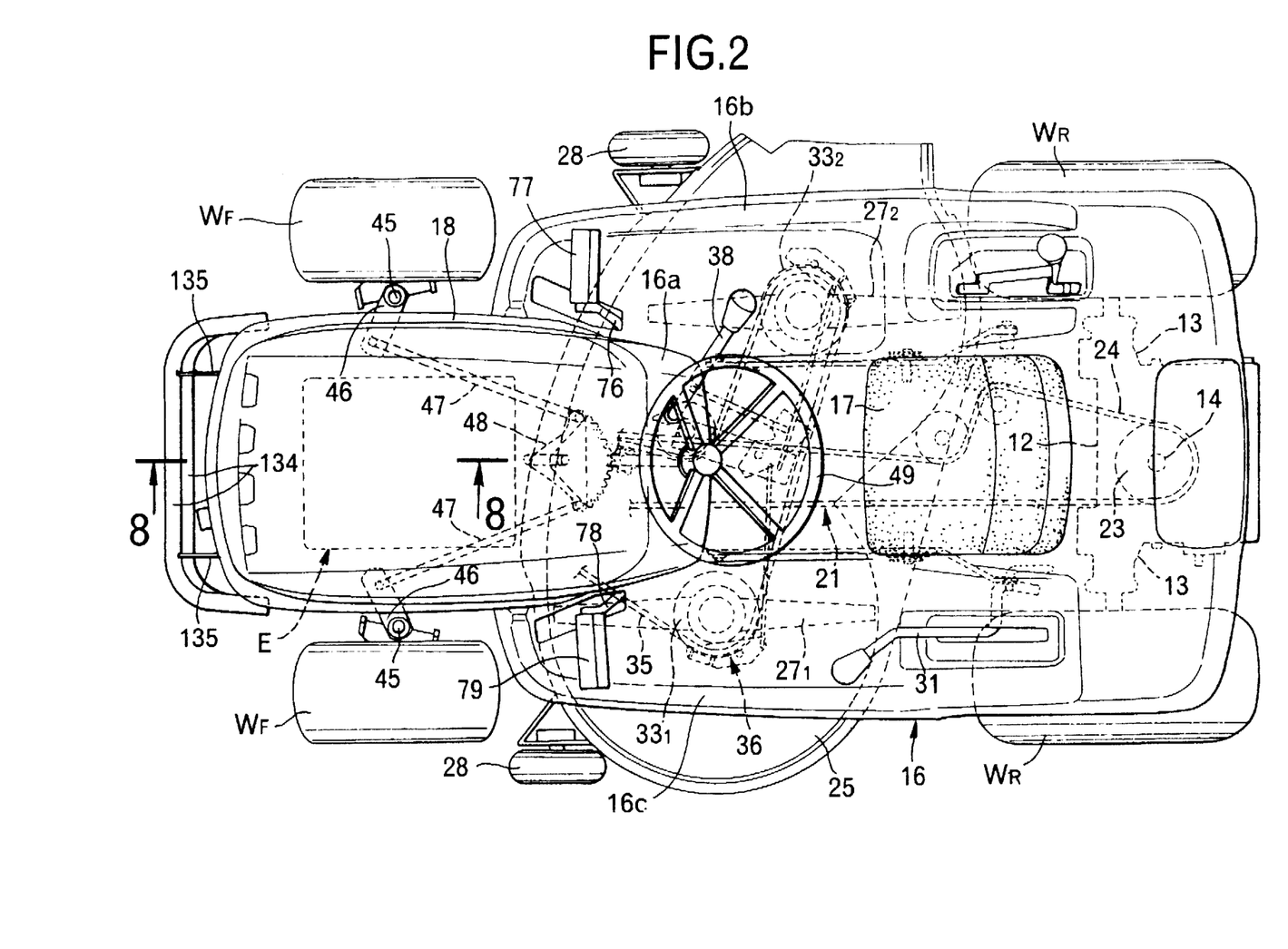
FIG. 2 is a plan view of the riding lawn mower.

Referring first to FIGS. 1 and 2, a riding lawn mower which is a utility vehicle includes a vehicle frame 11 longitudinally extending over a long length. A pair of left and right front wheels $W_F$, $W_F$ are steerably suspended at a front portion of the vehicle frame 11. A transmission case 12 is fixed at a rear portion of the vehicle frame 11, and rear wheels $W_R$, $W_R$ are rotatably carried by rear axle housings 13, 13 which are secured to left and right sides of the transmission case 12. Thus, a power applied from an upper portion of the transmission case 12 to an input shaft 14 is transmitted to both the rear wheels $W_R$, $W_R$ through a transmitting mechanism within the transmission case 12 and a differential mechanism (not shown).

A vertical engine E is mounted at the front portion of the vehicle frame 11. A support frame 15 is fixed on the vehicle frame 11 in back of the engine. A cover 16 is mounted on the vehicle frame 11 to cover a rear and upper portion of the vehicle frame 11. The cover 16 has a column portion 16a which extends upwardly to cover the support frame 15. A seat 17 is disposed on the cover 16 at a location rearwardly spaced apart from the column portion 16a. A vertically extending steering shaft 50 is disposed within the column portion 16a, and a steering wheel 49 is secured to an upper end of the steering shaft 50 which protrudes from the column portion 16a.

The engine E on the vehicle frame 11, a fuel tank 19 disposed on the support frame 15 and the like are covered with a bonnet 18. A front portion of the bonnet 18 is provided for opening forwardly.

Figure 3:
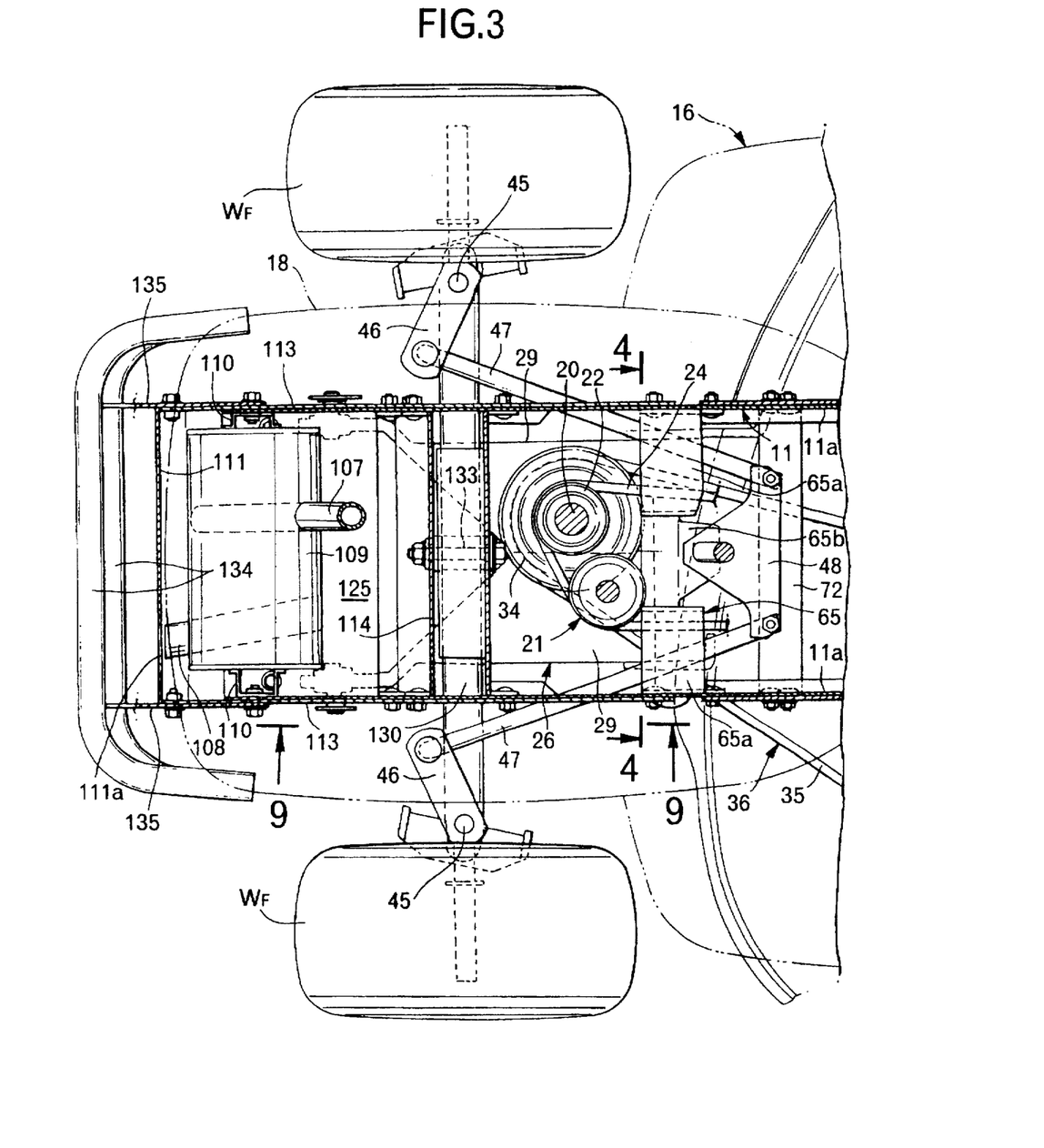
FIG. 3 is an enlarged sectional view taken along a line 3—3 in FIG. 1.
Figure 4:
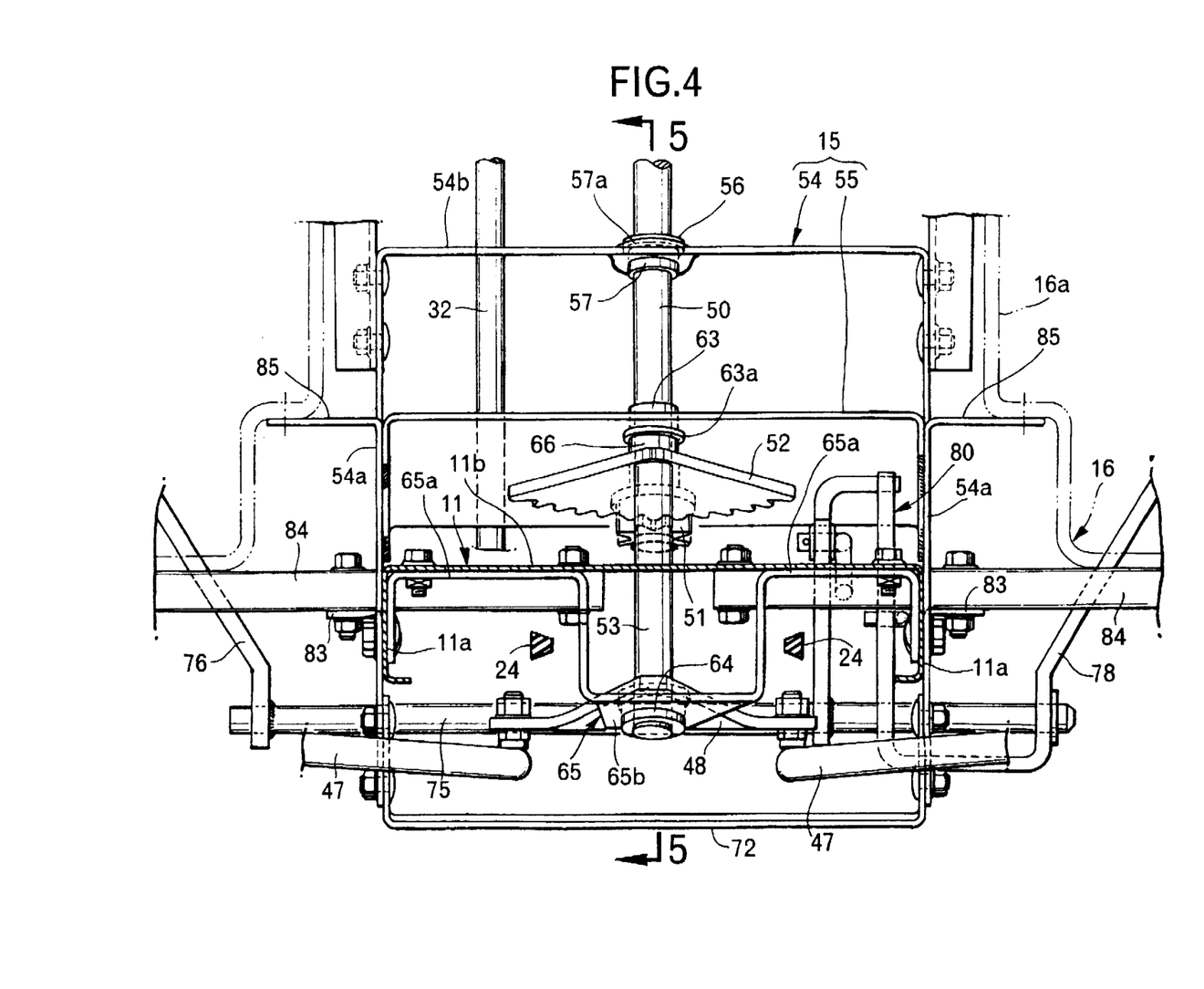
FIG. 4 is an enlarged sectional view taken along a line 4—4 in FIG. 3.
Figure 5:
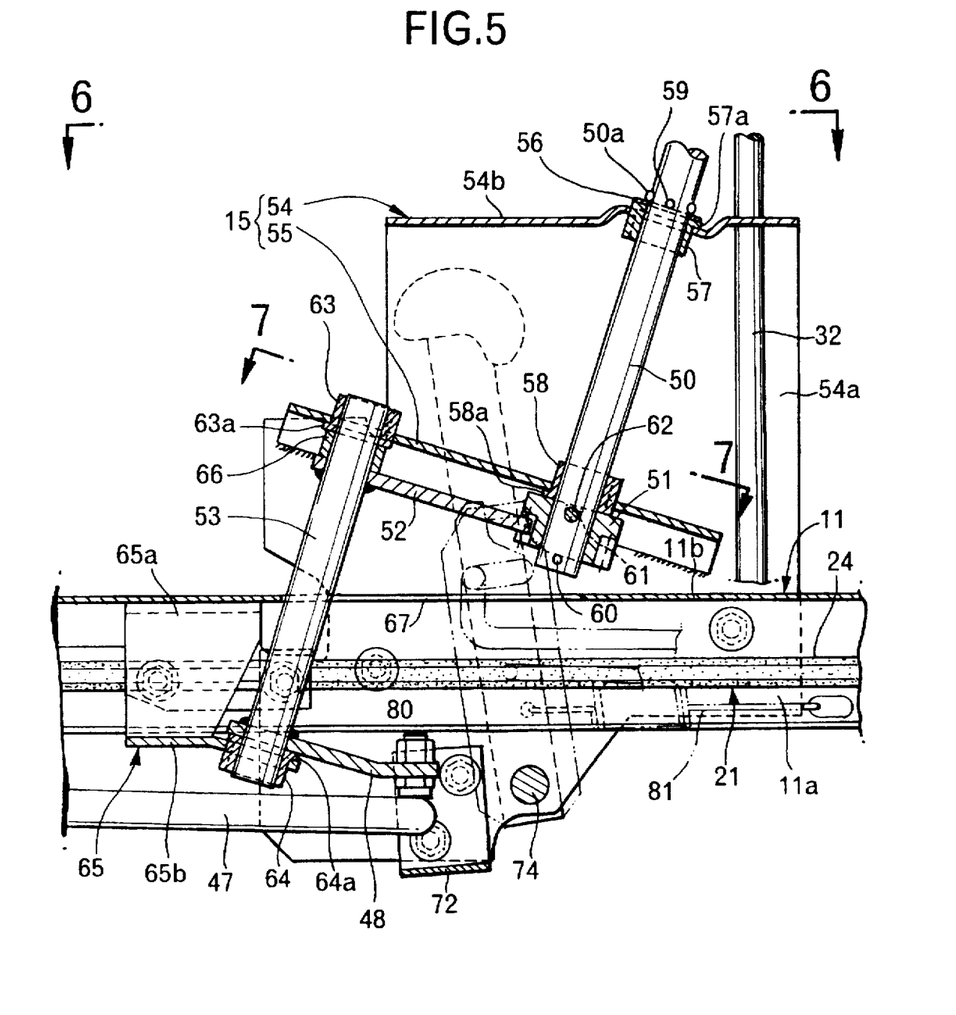
FIG. 5 is a sectional view taken along a line 5—5 in FIG. 4.
Figure 6:
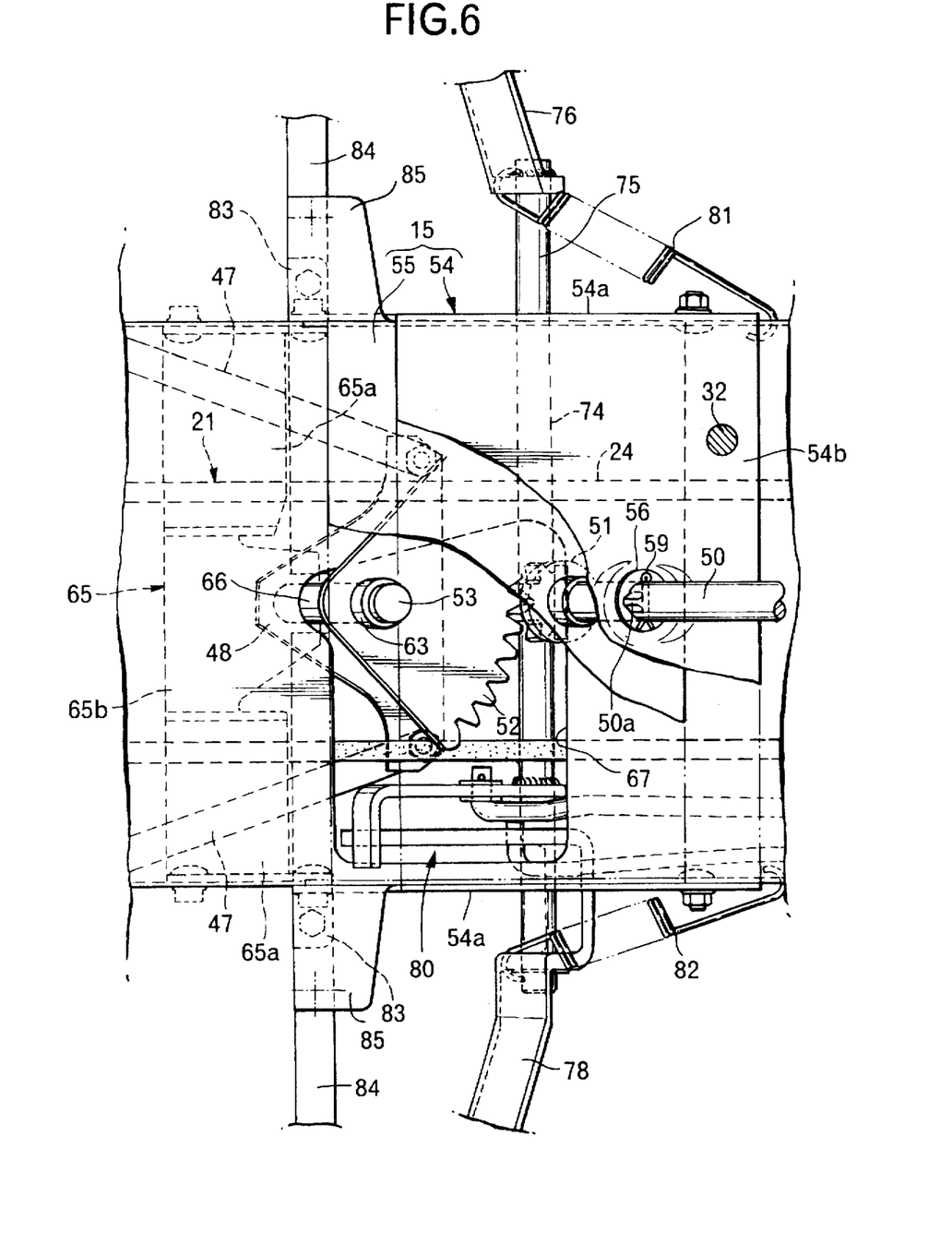
FIG. 6 is a view taken along a line 6—6 in FIG. 5.
Figure 7:
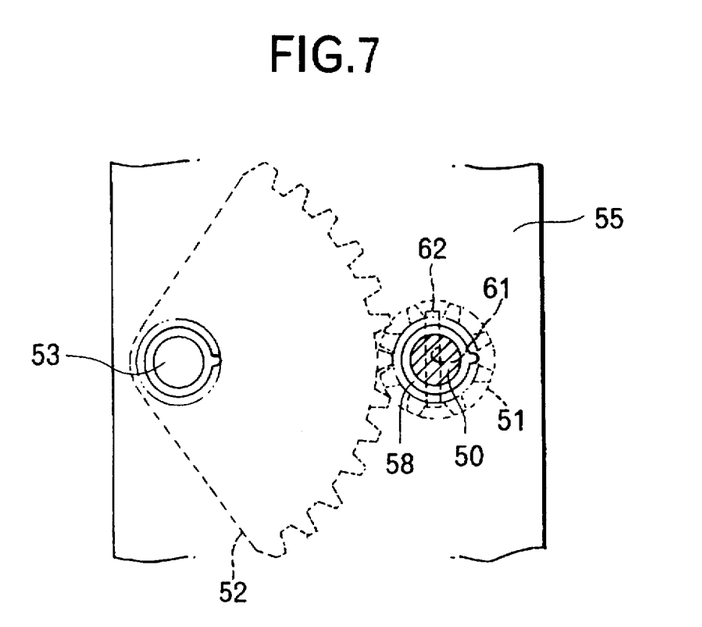
FIG. 7 is a view taken along a line 7—7 in FIG. 5.

Referring also to FIG. 3 in addition to FIGS. 1 and 2, a power from a crankshaft 20 extending downwardly from the engine E and having a substantially vertical axis is transmitted through a power transmitting means 21 to the transmission case 12. The power transmitting means 21 includes a driving pulley 22 fixedly mounted at an intermediate portion of the crankshaft 20, a follower pulley 23 fixedly mounted on the input shaft 14, and a rear wheel power transmitting endless belt 24 wound around the driving and follower pulleys 22 and 23. The power transmitting means 21 is switchable between a state in which the endless belt 24 is tightened to transmit the power from the crankshaft 20 to the input shaft 14, and a state in which the endless belt 24 is loosened to cut off the transmission of the power.

A cutter housing 25 is disposed below the vehicle frame 11 and between the front wheels $W_F$, $W_F$ and the rear wheels $W_R$, $W_R$ and carried by the vehicle frame 11 for lifting and lowering movement by a link mechanism 26.

The cutter housing 25 is formed into a dish-like configuration with a bottom opened, and a pair of cutters $27_1$ and $27_2$ which are utility tools are rotatably accommodated in the cutter housing 25. A rollers 28, 28 are pivotally supported on opposite side of the cutter housing 25 for rolling movement on a ground surface to define a lowermost position for the cutter housing 25.

The link mechanism 26 constitutes so-called a parallel link, and includes a pair of front links 29 which interconnects the front portion of the vehicle frame 11 and a front portion of the cutter housing 25, and a pair of rear links 30 which interconnects an intermediate portion of the vehicle frame 11 and a rear portion of the cutter housing 25. Thus, the cutter housing 25 is lifted and lowered with a constant attitude with respect to the ground surface by operating a lifting/lowering lever 31 which is disposed on a left side of the seat 17 and connected to one of the rear links 30.

Follower pulleys $33_1$ and $33_2$ are disposed on the cutter housing 25 and coaxially connected to the cutters $27_1$ and $27_2$. A driving pulley 34 is fixedly mounted on the crankshaft 20 of the engine E. A wrapping type transmission system 36 is constructed by winding op an endless belt 35 around the driving and follower pulleys 34 and $33_1$ and $33_2$. The wrapping type transmission system 36 is switchable between a clutch-on state in which the endless belt 35 is tightened, and a clutch-off state in which the endless belt 35 is loosened, in response to turning movement of an operating shaft 32 disposed within the column portion 16a to extend vertically. The operating lever 37 is fixed to an upper end of the operating shaft 32.

Referring also to FIGS. 4, 5, 6 and 7, the vehicle frame 11 includes a pair of vertical frame portions 11a, 11a longitudinally extending in parallel to each other and interconnected at their upper ends by a connecting portion 11b. The support frame 15 is mounted to the vehicle frame 11 to cover the connecting portion 11b from above. The support frame 15 includes: a substantially U-shaped frame body 54 having a pair of side support portions 54a, 54a which are secured to outer sides of the vertical frame portions 11a, 11a of the vehicle frame 11 and interconnected at their upper ends by an upper support portion 54b; and a lower support portion 55 which is provided between the connecting portion 11b of the vehicle frame 11 and the upper support portion 54b to extend between both the side support portions 54a, 54a.

The steering shaft 50 is inserted through a first bush 57 which engages the upper support portion 54b from above, and through a second bush 58 which engages the lower support portion 55 from below. The first bush 57 is formed into a cylindrical shape and is provided at its upper end with a first flange portion 57a protruding radially outwardly. The first bush 57 is inserted into and mounted to the upper support portion 54b for inhibited rotation about an axis, and the first flange portion 57a is engaged with the upper support portion 54b from above. The second bush 58 is formed into a cylindrical shape and is provided at its low end with a second flange portion 58a protruding radially outwardly. The second bush 58 is inserted into and mounted to the lower support portion 55 for inhibited rotation about an axis, with the second flange portion 58a is engaged with the upper support portion 54b from above.

Caulking projections 50a are provided on the steering shaft 50 at a plurality of circumferentially spaced locations and serve as locking portions locked on an upper surface of the first flange portion 57a with a washer 56 interposed therebetween. A split pin 59 is mounted on the steering shaft 50 and serves as locking portions locked on the upper surface of the first flange portion 57a with the washer 56 interposed therebetween.

A split pin 60 is mounted on a lower end of the steering shaft 50 and locked on a lower end face of a driving gear 51. The driving gear 51 is thrust-supported on a lower surface of the second flange portion 58a. A fitting groove 61 is provided in that surface of the driving gear 51 which is adjacent the second bush 58. The fitting groove 61 extends in a radial direction of the steering shaft 50 and closed at its opposite ends. A pin 62 is fitted into the fitting groove 61 to extend radially through the steering shaft 50. Thus, the driving gear 51 is connected to and supported on the steering shaft 50 in a manner that the rotation of the driving gear 51 relative to the steering shaft 50 is inhibited by the fitting of the pin 62 into the fitting groove 61, and the separation of the driving gear 51 from the steering shaft 50 is inhibited by the split pin 60.

A rotary shaft 53 is inserted through a third bush 63 which engages the lower support portion 55 from below, and through a fourth bush 64 which engages, from above, a bracket 65 mounted to the vehicle frame 11. The rotary shaft 53 has an axis substantially parallel to the steering shaft 50. The third bush 63 is formed into a cylindrical shape and is provided at is lower end with a third flange portion 63a protruding radially outwardly. The third bush 63 is inserted into and mounted to the lower support portion 55 in a manner that the rotation thereof about an axis is inhibited, with the third flange portion 63a engaging the lower support portion 55 from below.

The endless belt 24 of the power transmitting means 21 capable of transmitting the power to the rear wheels $W_R$ and $W_R$ is disposed such that the endless belt 24 can run below the vehicle frame 11. The bracket 65 includes a pair of mounting portions 65a, 65a and a shaft supporting portion 65b which interconnects the mounting portions 65a, 65a. The mounting portions 65a, 65a are substantially U-shaped to stride over the endless belt 24 and coupled to an inner surface of the vertical frame portion 11a and a lower surface of the connecting portion 11b of the vehicle frame 11. The fourth bush 64 is formed into a cylindrical shape and is provided at its upper end with a fourth flange portion 64a protruding radially outwardly. The fourth bush 64 is inserted into and mounted to the shaft supporting portion 65b of the bracket 65 in a manner that the rotation of the fourth bush 64 about its axis is inhibited. The fourth flange portion 64a is engaged with the shaft supporting portion 55 from above.

A driven gear 52, which is a sector gear, is secured to an upper end of the rotary shaft 53 by welding and thrust-supported by the third flange portion 63a of the third bush 63 through a cylindrical collar 66 which surrounds the rotary shaft 53. A pitman arm 48 is secured to a lower end of the rotary shaft 53 by welding. The pitman arm 48 is thrust-supported by the fourth flange portion 64a of the fourth bush 64.

The connecting portion 11b of the vehicle frame 11 is provided with a through-hole 67 through which the rotary shaft is passed. The through-hole 67 is formed into such a shape that the driven gear 52 can be inserted through the through-hole 67. The operating shaft 32 switches the transmission and cut-off of the power between the engine E and both the cutters $27_1$, and $27_2$ from one to another, and is disposed to extend vertically within the support frame 15.

The side support portions 54a, 54a of the frame body 54 of the support frame 15 are provided to extend below the vehicle frame 11, and a stopper 72 for defining an upper limit position for the cutter housing 25 is secured to lower ends of the side support portions 54a, 54a.

A pedal shaft 75 is carried on the side support portions 54a, 54a of the frame body 54 at a position in back of the stopper 72 for rotation about an axis and has opposite ends protruding outwardly from the side support portions 54a, 54a. A brake lever 76 is disposed on a platform 16b integrally provided on the cover 16 on a right sided of the column portion 16a, and is secured at its lower end to one end of the pedal shaft 75. A brake pedal 77 is mounted to an upper end of the brake lever 76. A clutch lever 78 is disposed on a platform 16c integrally provided on the cover 16 on a left sided of the column portion 16a, and is rotatably carried at its lower end on the other end of the pedal shaft 75. A clutch pedal 79 is mounted on an upper end of the clutch lever 78. Moreover, an interlocking link mechanism 80 is mounted between the pedal shaft 75 connected to the brake lever 76 and the clutch lever 78 and is disposed within the support frame 15. The interlocking link mechanism 80 is constructed such that the clutch lever 78 can be rotated in operative association with and by the turning movement of the brake lever 76 caused in response to the depression of the brake pedal 77, but the brake lever 78 cannot be operated in association with the turning movement of the clutch lever 78 caused in response to the depression of the clutch pedal 79. Further, return springs 81 and 82 are compressed between the brake lever 76 as well as the clutch lever 78 and the vehicle frame 11, respectively.

Support flange portions 83, 83 folded back outwardly are provided on the support portions 54a, 54a of the frame body 54 of the support frame 15, respectively. Floor-mounted pipes 84, 84 are fastened on the support flange portions 83, 83 for supporting the platforms 16b and 16c of the cover 16. Also, support flange portions 85, 85 folded back outwardly are provided on the side support portions 54a, 54a of the frame body 54 at locations above the support flange portions 83, 83. And the cover 16 is fastened directly on the support flange portions 85, 85.

Figure 8:
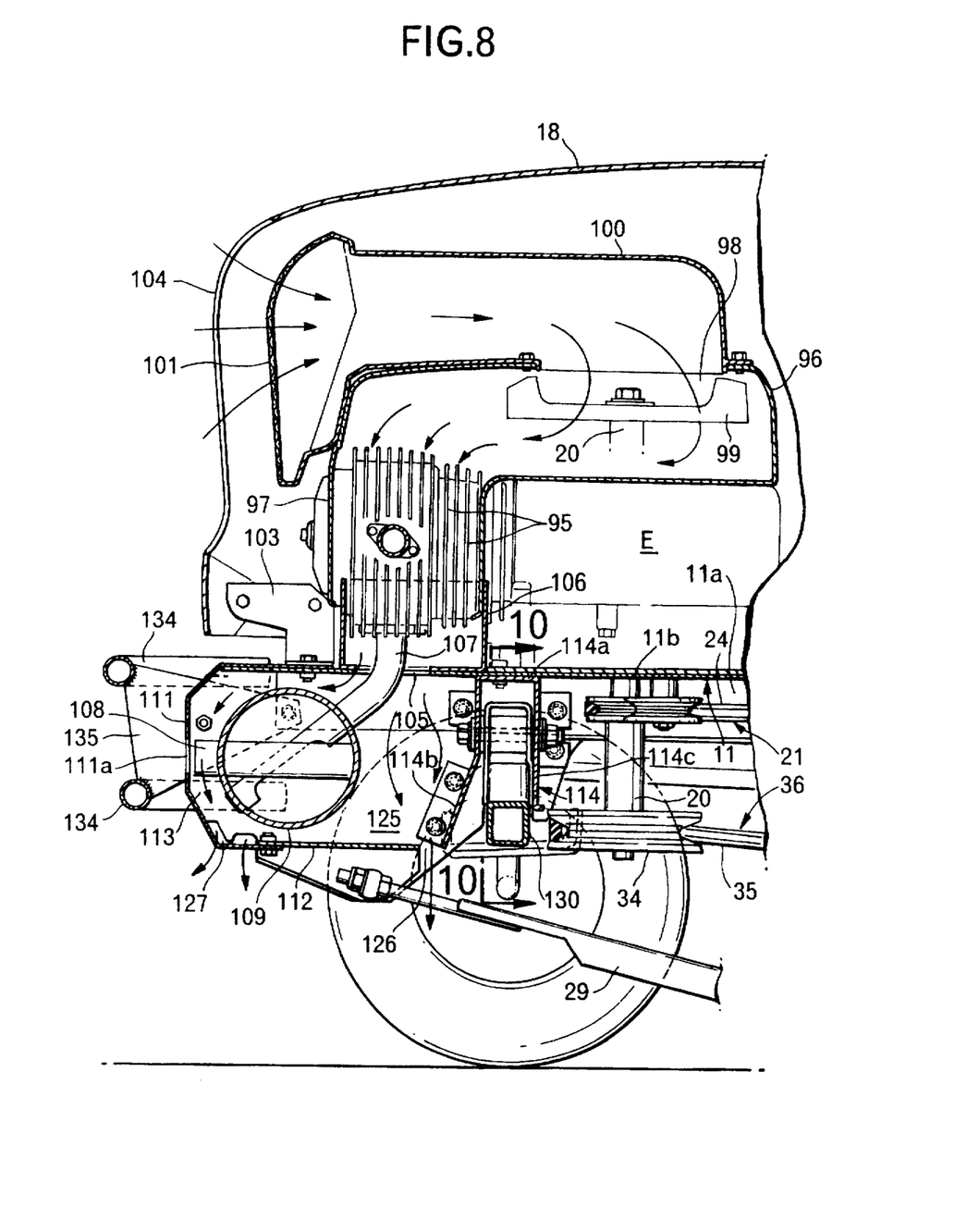
FIG. 8 is an enlarged sectional view taken along a line 8—8 in FIG. 2.

Referring also to FIG. 8, the engine E is forcedly air-cooled, and a large number of fins 95 are projectingly mounted on a cylinder head and a cylinder block of the engine E. A air-cooling duct 97 is mounted to extend downwardly and cover the fins 95, and is integrally connected to a fan cover 96 which is mounted on the engine E so as to cover an upper portion of the engine E. A cooling fan 99 is mounted to the crank shaft 20 and disposed in an introduction opening 98 which is provided in a rear and upper portion of the fan cover 96. An air intake duct 100 is disposed on the upper portion of the fan cover 96, so that it is connected to the introduction opening 98 and extends forwardly. A net member 101 is mounted in an opening provided at a front end of the air intake duct 100. Thus, the engine E is forcedly cooled by air drawn through the air intake duct 100 into the fan cover 96 in response to the operation of the cooling fan 99 and flowing downwardly between the fins 95 within the air-cooling duct 97.

The engine E to which the fan cover 96 including the air-cooling duct 97 and the air intake duct 100 are mounted, the auxiliaries of the engine E, e.g., the fuel tank 19 and carburetor (not shown) and the like, are covered with the bonnet 18. The bonnet 18 is pivotally mounted on a bracket 103 mounted at the front portion of the vehicle frame 11, for turning movement between a position in which the bonnet 18 covers the engine and the other auxiliaries in such a manner that a rear edge of the bonnet 18 is superposed on a front edge of the column portion 16a from above, and a position in which the bonnet 18 is inclined forwardly to uncover the engine and the other auxiliaries. Moreover, a plurality of air intake ports 104 are provided in the form of vertically extending slits in a front portion of the bonnet 18 for taking air into the bonnet 18.

An opening 105 is provided in a connecting plate portion 11b of the vehicle frame 11. A connecting duct 106 is secured onto the connecting plate portion 11b for conducting air flowing into the air-cooling duct 97 to the opening 105. Moreover, an exhaust pipe 107 for the engine E is mounted to extend forwardly and downwardly from the engine E through the opening 105 and is connected to a muffler 109 which is disposed below the upper surface of the vehicle frame 11.

The muffler 109 is formed into a cylindrical shape with its opposite ends closed. Stays 110, 110 are mounted at the opposite ends of the muffler 109 and fixedly supported on both the vertical frame portions 11a, 11a of the vehicle frame 11, respectively.

A front cover 111 is secured at its upper end to the connecting plate portion 11b at the front end of the vehicle frame 11 to cover the muffler 109 from front. A bottom plate 112 is connected to a lower end of the front cover 111 and covers the muffler 109 from below. A pair of side plates 113, 113 are secured to the front portion of the vehicle frame 11 such as to superpose on both the vertical frame portions 11a, 11a from outside. An exhaust pipe 108 for discharging the exhaust gas to the outside is connected to the muffler 109, and has a front end disposed within the front cover 111. An exhaust port 111a is provided in the front cover 111 in correspondence to an opening provided at the front end of the exhaust pipe 108.

Figure 9:
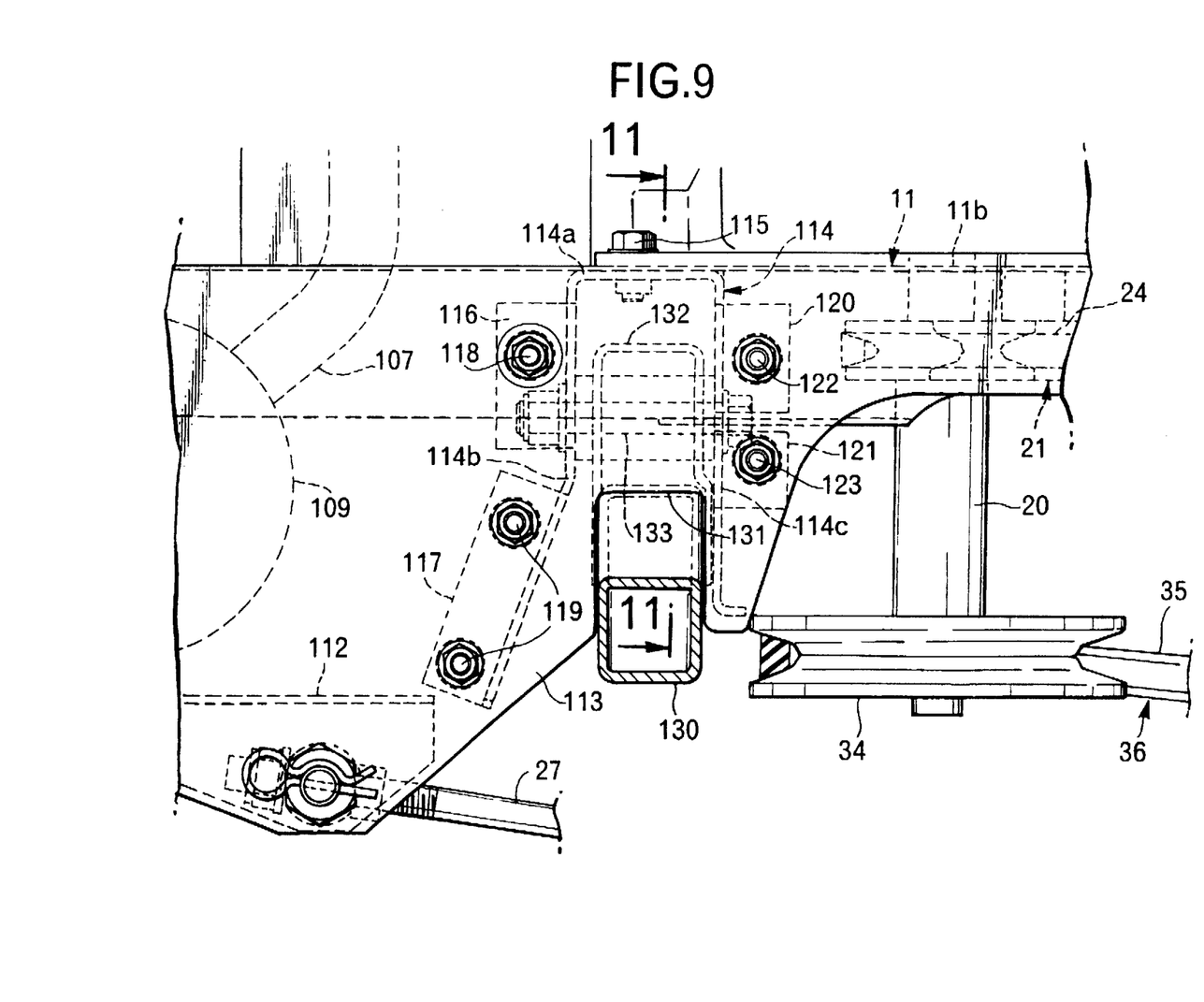
FIG. 9 is an enlarged sectional view taken along a line 9—9 in FIG. 3.
Figure 10:
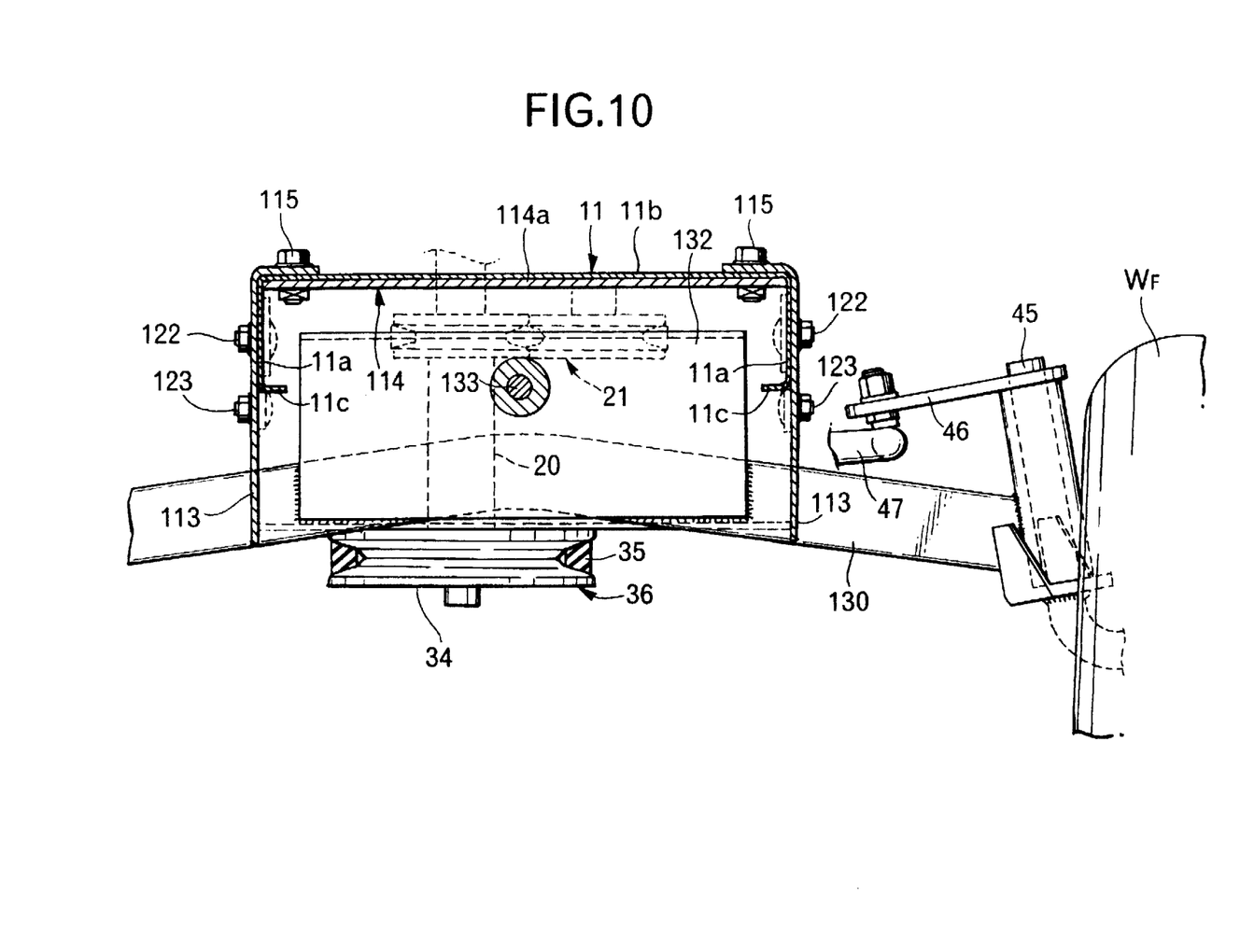
FIG. 10 is a sectional view taken along a line 10—10 in FIG. 8.
Figure 11:
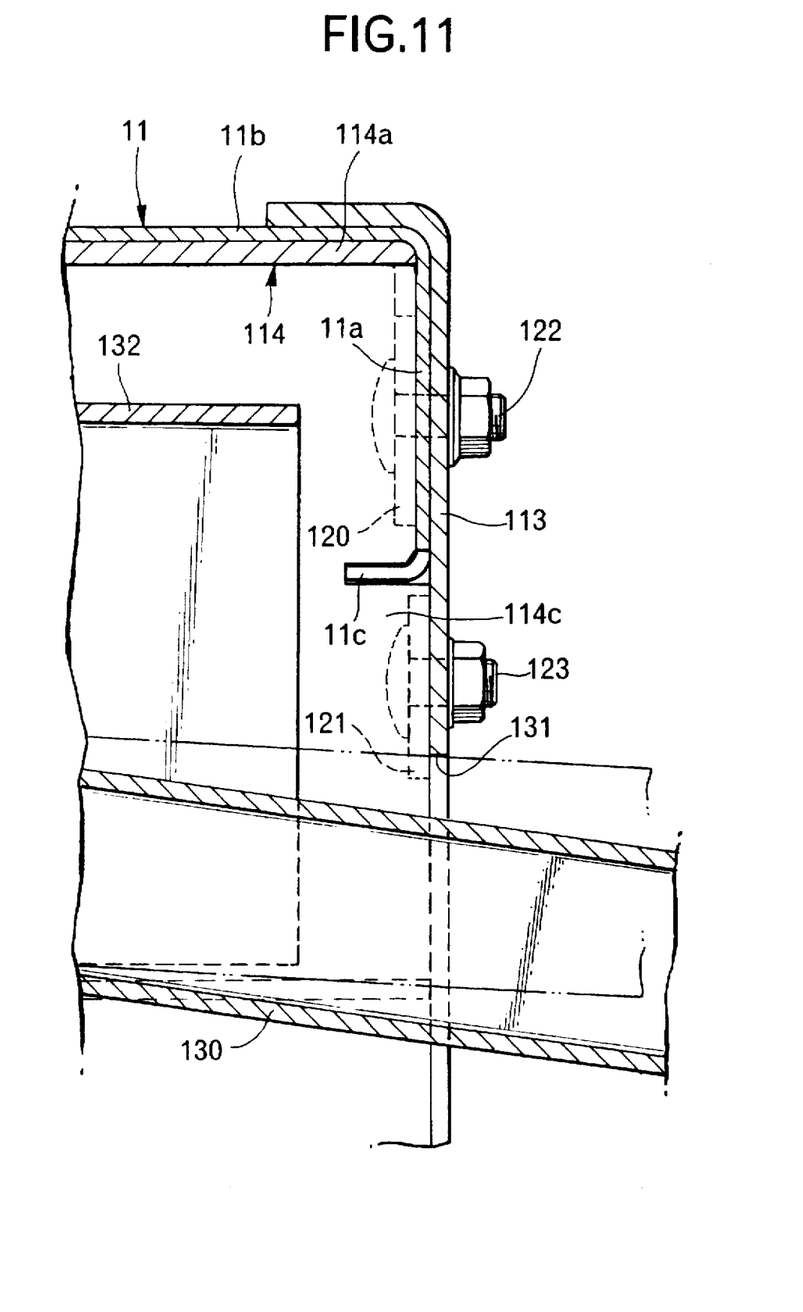
FIG. 11 is a sectional view taken along a line 11—11 in FIG. 9.

Referring to FIGS. 9, 10 and 11, a front axle frame 114 is mounted in back of the muffler 109 to extend between the vertical frame portions 11a, 11a of the vehicle frame 11, and has a substantially U-shape in cross section with a bottom opened. More specifically, the front axle frame 114 includes: an upper plate portion 114a which extends between both the vertical frame portions 11a, 11a of the vehicle frame 11 and abuts against a lower face of the connecting plate portion 11b; a front plate portion 114b which extends downwardly from a front edge of the upper plate portion 114a and has opposite side ends abutting against inner surfaces of the vertical frame portions 11am 11a and side plates 113, 113; and a rear plate portion 114c which extends downwardly from a rear edge of the upper plate portion 114a and has opposite side ends abutting against the inner surfaces of the vertical frame portions 11am 11a and the side plates 113, 113. The opposite ends of the upper plate portion 114a are fixedly connected along with the upper folded end portions of the side plates 113, 113 to the connecting plate portion 11b by bolts 115, 115. The front plate portion 114b is provided at upper portions of its opposite side ends with folded portions 116 which abut against the inner surfaces of the vertical frame portions 11a. The front plate portion 114b is also provided at lower portions of its opposite side ends with folded portions 117 which abut against the inner surfaces of the side plates 113. The folded portion 116, the vertical frame portion 11a and the side plate 113 are integrally connected together by a bolt 118. The folded portion 117 and the side plate 113 are integrally connected to each other by a pair of bolts 119, 119. Further, the rear plate portion 114a is provided at its opposite side ends with folded portions 120 which abut against the inner surfaces of the vertical frame portions 11a, and is provided at its opposite side ends with folded portions 121 which abut against the inner surfaces of the side plates 113. The folded portion 120, the vertical frame portion 11a and the side plate 113 are integrally connected together by a bolt 122. The folded portion 121 and the side plate 113 are integrally connected to each other by a bolt 123. Moreover, an inwardly protruding flange portion 11c is provided on a lower edge of each of the vertical frame portion 11a of the vehicle frame 11 in a location where the front axle frame 114 is mounted. These flanges 11c increases the strength of the vehicle frame 11.

The front plate portion 114b of the front axle frame 114 defines a muffler accommodating chamber 125 having the muffler 109 accommodated and disposed therein by cooperation with the vehicle frame 11, the front cover 111, the bottom plate 112 and both of the side plates 113, 113. Specifically, the front plate portion 114b of the front axle frame 114 forms a rear wall of the muffler accommodating chamber 125.

The air which has cooled the engine is introduced through the opening 105 into the muffler accommodating chamber 125, and such flowing of the air cools the muffler 109. A slit-like exhaust port 126 is provided between a rear edge of the bottom plate 112 and a lower end edge of the front plate portion 114b, and exhaust ports 127 are provided between lower ends of front ends of the side plates 113 and the front cover 111, respectively.

A lengthwise intermediate portion of a front axle beam 130 having a quadrilateral cross section is inserted into the front axle frame 114. The side plates 113 are provided with notches 131, respectively, which open a lower portion of the front axle frame 114 at its opposite ends. The front axle beam 130 is inserted through the notches 131 into the front axle frame 114. Moreover, in order to avoid that the front axle beam 130 positions in front of the endless belt 35 wound around the driving pulley 34 on the crankshaft 20 in a vicinity of and in back of a lengthwise central portion of the front axle beam 130, the front axle beam 130 is formed such that its height increases toward its lengthwise central portion, i.e., toward the center of swinging movement. Such arrangement prevents the endless belt 35 from being sprung toward the front axle beam 130 to come into contact with the front axle beam 130 upon clutch-off of the wrapping type transmission system 36, leading to an enhanced durability of the endless belt 35.

A support member 132 is secured to the lengthwise central portion of the front axle beam 130 and formed into a U-shape to sandwich the front axle beam 130 from opposite sides. A support shaft 133 is fixed to the front axle frame 114 to extend through the support member 132 and has an axis extending in the lengthwise direction of the vehicle frame 11, i.e., in the longitudinal direction of the riding lawn mower. Thus, the front axle beam 130 is swingably supported on the front axle frame 114, and the limit of swinging movement of the front axle beam 130 is defined by abutment of the front axle beam 130 against an upper edge of the notch 131 provided in the side plate 113.

Axles 45, 45 for carrying the front wheels $W_F$, $W_F$ are steerably supported at opposite ends of the front axle beam 130 and formed into a substantially L-shape. Tie rods 47, 47 are connected at their front ends to knuckle arms 46, 46 which are connected to upper ends of the axles 45, 45, respectively. The rear ends of the tie rods 47, 47 are commonly connected to the pitman arm 48. Thus, the steering quantity of steering wheel 49 (see FIGS. 1 and 2) is transmitted through the steering shaft 50, the driving gear 51, the driven gear 52 and the rotary shaft 53 to the pitman arm 48 in response to the operation of the steering wheel 49 by an occupant on the seat 17.

Referring again to FIGS. 1 to 3, a pair of bumpers 134, 134 are disposed at locations in front of the front cover 111 to cover the latter from a front side thereof, and are each formed into a rod-like configuration and extend in a widthwise direction of the vehicle frame 11. The bumpers 134, 134 are mounted at a vertical distance to a pair of support plate 135, 135 which are secured to the vehicle frame 11 and the side plates 113, 113 in such a manner that they are superposed on the side plates 113, 113 from outside. Upper one of the bumpers 134 is disposed substantially in correspondence to the upper surface of the vehicle frame 11, so that it cannot interfere with the opening of the bonnet 18. The distance between both the bumpers 134, 134 is set such that more than upper half of the muffler 109 positions between both the bumpers 134, 134 in height, as viewed from sideways of the vehicle frame 11, as shown in FIG. 1.

The operation of this embodiment will be described below. The steering shaft 50 is provided at its upper end with the steering wheel 49, and is inserted through the first bush 57 having the first flange portion 57a engaging the supper support portion 54b from above, and through the second bush 58 having the second flange portion 58a engaging the lower support portion 55 from below. The caulking projections 50a are provided at the circumferentially spaced locations on the steering shaft 50 and locked to the upper surface of the first flange portion 57a. The split pin 59 is mounted on the steering shaft 50 and locked to the upper surface of the first flange portion 57a. The driving gear 51 is connected to and supported on the steering shaft 50 and thrust-supported on the lower surface of the second flange portion 58a. Therefore, the upward movement of the steering shaft 50 is limited by the engagement of the driving gear 51 with the second flange portion 58a from below, and the downward movement of the steering shaft 50 is limited by abutment of the caulking projections 50a and the split pin 59 against the first flange portion 57a from above. In a condition in which the upward and downward movements of the steering shaft 50 have been limited, the steering shaft 50 is turnably supported by the first and second bushes 57 and 58. In a condition in which the driving gear 51 is not yet mounted, the steering shaft 50 is inserted through the first and second bushes 57 and 58 from above and then, the driving gear 51 is mounted to the lower end of the steering shaft 50.

The driven gear 52 and the pitman arm 48 are integrally secured to the upper and lower opposite ends of the rotary shaft 53. The driven gear 52 is thrust-supported by the third bush 63 disposed on the lower support portion 55, and the pitman arm 48 is thrust-supported by the fourth bush 64 disposed on the bracket 65. Therefore, in a condition in which the vertical movement of the rotary shaft 53 has been limited, the rotary shaft 53 is rotatably supported by the third and fourth bushes 63 and 64. Thus, the arrangement between the driven gear 52 and the pitman arm 48 can be made with a minimum number of parts, which contributes to a reduction in number of assembling steps. In assembling the rotary shaft 53 to the support frame 15, the rotary shaft 53 is inserted through the third and fourth bushes 63 and 64 from below. In this case, the assembling of the rotary shaft 53 to the support frame 15 can be easily achieved, because the through-hole 67 provided in the vehicle frame 11 is formed into the shape such that the driven gear 52 can be inserted through the through-hole.

Moreover, the driving and driven gears 51 and 52 are disposed between the lower support portion 55 and the bracket 65, and the side support portions 54a, 54a are disposed oppositely sideways from the gears 51 and 52. Therefore, it is possible to protect both the gears 51 and 52 which are important parts from an external force.

The steering shaft 50 and the driving gear 51 can be prepared as an assembly composed of the steering shaft 50 and the driving gear 51 assembled to the support frame 15. The assembly may be mounted to the vehicle frame and hence, the assembling operation is facilitated. In addition, by the fact that the second and third bushes 58 and 63 are disposed on the lower support portion 55, it is possible to accurately determine the distance between steering shaft 50 and the rotary shaft 53.

The bracket 65 includes: the pair of mounting portions 65a, 65a which are substantially U-shaped to stride over the endless belt 24 and coupled to the inner surface of the vertical frame portion 11a and the lower surface of the connecting portion 11b; and the shaft supporting portion 65b which interconnects the mounting portions 65a, 65a. The fourth bush 64 is disposed on the shaft supporting portion 65b. Therefore, the bracket 65 can perform not only a function to support the rotary shaft 50, but also a function as a strength member for reinforcing the vehicle frame 11 without interfering with the traveling of the endless belt 24. This contributes to a reduction in number of parts.

Further, the interlocking link mechanism 80 and the operating shaft 32 are disposed within the support frame 15. Thus, the support frame 15 can perform a function to protect the parts of from the steering shaft 50 to the pitman arm 48, and a function to protect the interlocking link mechanism 80 and the operating shaft 32.

The front axle frame 114 performs a function to support the front axle beam 130 as well as a function as the strength member serving as a cross member which interconnects the vehicle frame 11 and both the vertical frame portions 11a, and moreover, performs a function as a member to form the rear wall of the muffler accommodating chamber 125. Thus, it is possible to simplify the arrangement, while permitting the front axle frame 114 to perform more functions.

From the fact that the pair of bumpers 134, 134 formed into the rod-like configuration and extending in the widthwise direction of the vehicle frame 11 are mounted to the vehicle frame 11 at the location to cover the front cover 111 from the front thereof, even if there is a foreign matter in front of the front cover 111, such foreign matter collide against the bumpers 134, 134, so that a shock is absorbed. Thus, the foreign matter is reliably prevented from coming into direct contact with the front cover 111 from the front. Moreover, by the fact that the bumpers 134, 134 are disposed at the vertical distance, it is possible for cooling air to flow between both the bumpers 134, 134 toward the front cover 111, and hence, the cooling of the front cover 111 by the cooling air cannot be hindered by the bumpers 134, 134, and the outward appearance of the bumpers 134, 134 is satisfactory.

Moreover, since the distance between both the bumpers 134, 134 is set such that more than upper half of the muffler 109 corresponds to between both the bumpers 134, 134 in height, as viewed from sideways of the vehicle frame 11, that area of the front cover 111 which is struck by the air from the front is set to correspond to upper half or more of the muffler 109. Thus, as the effect of cooling of the front cover 111 by the cooling air is increased, the cooling of the muffler 109 existing in back of the front cover 111 is more effectively promoted.

Although the embodiment of the present invention has been described, it will be understood that the present invention is not limited to the above-described embodiment, and various modifications in design may be made without departing from the spirit and scope of the invention defined in claims.

What is claimed is:

1. A utility vehicle, comprising: a steering shaft provided at an upper end thereof with a steering wheel; a driving gear mounted on said steering shaft in operative association with said steering shaft; a rotary shaft which has an axis substantially parallel to said steering shaft and to which a pitman arm is continuously formed, and a driven gear which is fixed to said rotary shaft and meshed with said driving gear, wherein said utility vehicle further includes a support frame fixedly mounted on said vehicle frame and having a support portion, said driving gear being thrust-supported on a lower surface of said support portion and being mounted to and in operative association with said steering shaft which is inserted into and supported in said support portion, said rotary shaft passed through a through-hole provided in said vehicle frame being rotatably supported by said support portion and by a bracket mounted to said vehicle frame, in such a manner that an axially upward movement of said rotary shaft is limited by said support portion and an axially downward movement of said rotary shaft is limited by said bracket, and said pitman arm and said driven gear, meshed with said driving gear below said support portion, being connected to said rotary shaft.

2. A utility vehicle according to claim 1, wherein said support frame is provided with upper and lower support portions which are disposed at a vertical distance above said vehicle frame, said steering shaft being rotatably supported by a first bush and a second bush, said first bush mounted on said upper support portion and having a first flange portion engaging said upper support portion from above, and said second bush mounted on said lower support portion and having a second flange portion engaging said lower support portion from below, said steering shaft being provided with a locking portion which is locked to an upper surface of said first flange portion, said rotary shaft being rotatably supported by a third bush and a fourth bush, said third bush mounted on said lower support portion and having a third flange portion engaging said lower support portion from below, and said fourth bush mounted on said bracket and having a fourth flange portion engaging said bracket from above.

3. A utility vehicle according to claim 1, wherein said vehicle frame comprises a pair of vertical frame portions which extend in a longitudinal direction in parallel to each other and which is interconnected at their upper ends by a connecting portion, and said utility vehicle further includes an endless belt disposed below said connecting portion for transmitting a power from an engine mounted on said vehicle frame to a rear wheel, said bracket comprising a pair of mounting portions which are formed into a substantially U-shape to stride over said endless belt and are coupled to inner surfaces of said vertical frame portions and to a lower surface of said connecting portion, and a shaft supporting portion which interconnects said mounting portions, and said rotary shaft being rotatably supported by the shaft supporting portion.

4. A utility vehicle according to claim 1, wherein said driven gear is secured to an upper end of said rotary shaft and thrust-supported by the support portion, and said pitman arm is secured to a lower end of said rotary shaft and thrust-supported by the bracket, said through-hole provided in said vehicle frame being formed into a shape such that said driven gear can be inserted through said through-hole.

5. A utility vehicle according to claim 1, wherein said support frame includes: a pair of side support portions which are secured to opposite sides of said vehicle frame, respectively; a frame body which is formed into a substantially U-shape and has an upper support portion that interconnects upper ends of said side support portions; and a lower support portion provided between said vehicle frame and said upper support portion to extend between both said side support portions, and said utility vehicle further includes an interlocking link mechanism disposed within said support frame for operatively connecting a clutch lever to a brake lever.

6. A utility vehicle according to claim 1, wherein said support frame includes: a pair of side support portions which are secured to opposite sides of said vehicle frame, respectively; a frame body which is formed into a substantially U-shape and has an upper support portion that interconnects upper ends of said side support portions; and a lower support portion provided between said vehicle frame and said upper support portion to extend between both said side support portions, and said utility vehicle further includes an operating shaft which is disposed to vertically extend within said support frame for switching the transmission and cut-off of a power between an engine mounted on said vehicle frame and a utility tool supported by said vehicle frame.

* * * * *